UNITED STATES PATENT OFFICE.

DAVID STEWART, OF PORT PENN, DELAWARE.

IMPROVED PHOSPHATE FERTILIZING COMPOUND.

Specification forming part of Letters Patent No. 90,057, dated May 11, 1869.

*To all whom it may concern:*

Be it known that I, DAVID STEWART, M. D., of Port Penn, in the county of New Castle and State of Delaware, have produced certain Improvements in Fertilizing Compounds; and I do hereby declare that the following is a full, clear, and exact description of the substances employed and the process of compounding the same.

This invention relates to a new and economical mode of increasing the solubility of the phosphates used in agriculture by the use of reagents, which not only reduplicate their value, but are also themselves reduplicated in value, not only by co-operation directly as plant-food, but also, by the presence of strong bases, in promoting the proper assimilation of the plant-food, insuring thereby the normal products of vegetables, and especially of the cereals and fruit-trees, the proportion of which is generally admitted to be deficient in the absence of the substitutes hitherto universally employed by farmers, whereas the reagents hitherto employed lose one-half their commercial value, being reduced to the mere value of crude gypsum, &c., while yielding a small per cent. of soluble phosphoric acid, and forming at the same time a poisonous salt of iron and alumina when these bases are present in the manure or soil.

The nature of my invention consists in the production of manures from soluble silicates and phosphates by composting them with caustic alkalies, and thus continuing their reaction in the presence of the hydrated caustic lime.

This I accomplish by the formation of alternate layers of insoluble substances, above referred to, that have been previously moistened with a saturated solution of crude potash and caustic anhydrous or quick lime.

The saturated solution of potash may be formed by suspending it near the surface of a solution previously saturated with carnallite or some cheap salts of potash.

Any convenient quantity of the powder of the insoluble phosphate—such, for instance, as rock-redonda, or navassa, or other coprolite or guano—is thoroughly moistened with the solution of potash by the use of a garden water-pot and rake, or other suitable means, and then spread upon a floor, where it may repose.

The stratum may be spread in the form of a parallelogram, twice the length of its width, and about four or six inches thick. A sufficient quantity of the coarse powder of quicklime of oyster-shells or other pure anhydrous lime is then imposed on one-half of the moist stratum, equal, or nearly so, in bulk to the bulk of the dry powder (phosphate) first used. The uncovered half of the moist stratum is then thrown on top thereof, thus enveloping the quicklime between moist strata of phosphate. A sufficient quantity of the saturated solution of potash is then sprinkled over the compost to insure the slaking of all or nearly all the lime, and then another stratum of the phosphate, in powder, of about the same bulk as the first used, is spread upon the same area, after being moistened, as the first. Subsequently another stratum of the quicklime, of about the same bulk as the first, is imposed on the compost as before, and the remainder of the moist phosphate is made to envelop the lime, and is then slaked as before. Thus I continue to repeat the arrangement of substances, as in the first series or strata, to any convenient height.

In a few days all these strata may be cut through vertically, mixed, and barreled for use.

I throw into each barrel about a handful of ground gypsum to, say, each shovel of the compost, or a sufficient quantity of the gypsum to supply each barrel with about one gallon of it.

I thus produce what I denominate as "the persicator."

For crops that mature rapidly, and plants that are less permanent and require more immediate nourishment or solubility in the fertilizers placed about them, I vary the above, as follows: Instead of packing or barreling the persicator as complete for such uses, the mixture, before the addition of powdered gypsum to it, is thrown into a suitable vat, where it may remain for several weeks or months, or, if convenient, until reaction ceases, during which it is kept covered with a saturated solution of the potash. This magma is then spread, like mortar, over the same area, and precisely as the moist phosphate; then covered in part with coarsely-powdered quicklime, exactly as before; and this stratum of quicklime, in about the same original proportion, is enveloped with the moist magma from the area not covered with lime, thus repeating the original process, in the use of the magma as a substitute for the moistened powder first directed.

My object is, under this process last described, to dry the magma by slaking lime with it in such manner as will not tax the farmer with the expense of grinding, and still, by the increased solubility of the phosphoric acid, produce a result equally valuable to the persicator, although diluted, but not adulterated with lime, yet yielding a larger per cent. of potash.

The magma of the vat may be conveniently reduced to the desirable consistency for stratification, as above described, by throwing into the vat a sufficient quantity of unslaked lime. As soon as the lime in the above compost has ceased to slake the mass should be cut down and barreled with about the same proportion of plaster or gypsum.

Instead of treating the magma, as above mentioned, with a full quantity of lime, it may be put up in barrels, for use, in its moist condition, adding to it only a sufficient quantity of quicklime, slaked in the vat, to reduce it to a merchantable condition. In this condition it will occupy less space and cost less for transportation, the farmer being directed to stratify it with lime, so as to obtain the temperature generated in slaking the lime, for completing the maceration of the persicator.

I do not confine myself to the precise proportions above stated of the ingredients which I employ, as these proportions will vary considerably, according as they may be more or less rich or pure in the active principles required. I also claim the right to calcine the result called "persicator," with or without an equal bulk of shells or other lime, as a substitute for the process by maceration in a vat.

Having described my improved fertilizer, what I claim as new, and desire to secure by Letters Patent, is—

1. The manner of composting insoluble substances containing silicates and phosphates with caustic alkalies, substantially as described.

2. The improved fertilizer, which I term "the persicator," composed of the within-described ingredients, compounded in about the relative proportions stated.

DAVID STEWART, M. D.

Witnesses:
WM. W. FERRIS,
F. MCINTIRE.